United States Patent [19]

Wilkins

[11] Patent Number: 5,290,438
[45] Date of Patent: Mar. 1, 1994

[54] SEWAGE INCINERATION SYSTEM

[76] Inventor: Wilfred J. Wilkins, 108 Forest St., Plaistow, N.H. 03865

[21] Appl. No.: 997,323

[22] Filed: Dec. 28, 1992

[51] Int. Cl.⁵ ............................................... C02F 1/72
[52] U.S. Cl. .................................... 210/177; 210/184; 110/238
[58] Field of Search ....................... 110/238, 248, 251; 210/177, 180, 184, 456, 472

[56] References Cited

U.S. PATENT DOCUMENTS

| | | | |
|---|---|---|---|
| 548,254 | 10/1895 | Horsfall | 110/251 |
| 763,981 | 7/1904 | Hupchen | 210/196 |
| 801,251 | 10/1905 | Kilbourne | 110/248 |
| 1,336,722 | 4/1920 | Behr | 210/771 |
| 1,531,766 | 3/1925 | Trimborn et al. | 110/227 |
| 1,536,220 | 5/1925 | Jouclard | 110/251 |
| 1,609,933 | 12/1926 | Elmore et al. | 210/771 |
| 1,787,081 | 12/1930 | McLellan | 110/248 |
| 2,915,025 | 12/1959 | Stevenson, Sr. | 110/251 |
| 3,619,422 | 11/1971 | Rummel et al. | 210/771 |
| 3,817,377 | 6/1974 | Piggot | 210/767 |
| 4,043,280 | 8/1977 | Wray et al. | 110/238 |
| 4,098,200 | 7/1978 | Dauvergne | 110/204 |
| 4,116,136 | 9/1978 | Mallek et al. | 110/251 |
| 4,352,739 | 10/1982 | Oliver, Jr. et al. | 210/739 |
| 4,439,317 | 3/1984 | Jarrell | 210/194 |
| 4,631,133 | 12/1986 | Axelrod | 210/98 |
| 5,069,801 | 12/1991 | Girovich | 210/770 |

Primary Examiner—Peter A. Hruskoci
Assistant Examiner—Robert James Popovics
Attorney, Agent, or Firm—Lahive & Cockfield

[57] ABSTRACT

The invention is a sewage treatment system with a filter apparatus enclosed within a housing. The filter operates to separate a liquid component from a solid component of the sewage. It does so by having the sewage drop onto a diffuser. The diffuser has a conical shape with its apex facing upward. The diffuser breaks up the sewage and forces the sewage to flow against the filter walls. The filter walls are liquid permeable which separates liquid from solid.

The solid component then falls to the bottom of the filter walls which has as its base an incinerator plate. Hot air is then used to dry the sewage. The incinerator plate heats to a combustion temperature and burns the sewage. The ash resultant and the liquid component of the sewage is then removed from the chamber.

5 Claims, 1 Drawing Sheet

SEWAGE INCINERATION SYSTEM

BACKGROUND OF THE INVENTION

1. Field of the Invention

The present invention relates to an apparatus for treating sewage at its source, for example, at a residence or business. The apparatus substantially separates the sewage into its solid and liquid components and then incinerates the solid component.

2. Description of the Related Art

Typically, sewage is disposed of in one of the following three ways: municipal sewer system, private cesspool or private septic tanks.

A municipal sewer system requires a connection from a toilet to a sewage treatment plant. The sewage is carried through pipes to the plant by large quantities of fresh water. Such treatment plants typically employ chemical and bacterialogical treatment methods for decomposing and purifying the sewage.

While generally effective, the municipal sewer system does have some substantial deficiencies. One deficiency is encountered primarily in urban areas where sewer systems are common. The problem arises with the fixed capacity of the sewer system. Sewers and sewage treatment plants cannot respond to urban growth. Because new buildings need sewer connections, this problem has lead to a moratorium on new construction in some areas. Where capacity has been exceeded, severe pollution and environmental hazards have been created as a result of overflowing systems.

There is no simple solution to this problem. System expansion is extremely expensive and requires a substantial lead time. Private systems generally cannot be used because of lack of available space and health considerations.

In rural and suburban areas where land is more plentiful, private septic tanks and cesspools have been employed. Both systems work by bacterial breakdown of the solid waste and subsequent drainage into leaching fields or overflow tanks. These systems both require large amounts of fresh water and are subject to clogging. The cesspool often has the added drawback of creating offensive odors. Each of these systems are subject to the percolating ability of the land as well as form of the terrain. The land must be able to diffuse the sewage properly. This is difficult in rocky areas. At the same time, the land cannot be too wet such that sewage travels to ground water. The terrain also is limited as to its form. A cesspool will not work well if the terrain is steep and the sewage simply runs out of the pool.

Several sewage treatment systems have been devised that treat sewage at the source.

One system, U.S. Pat. No. 4,439,317, uses grinders to pretreat the sewage and holding tanks for subsequent bacterial breakdown. This system is not only mechanically complex but presents many of the same operational problems associated with septic tanks.

Another system, U.S. Pat. No. 4,631,133, uses a gravity filtration system to separate the aqueous component and microwaves to incinerate the solid waste. The filter medium in this device is easily clogged over time necessitating frequent maintenance adding to an already high expense.

Accordingly, it is an object of the present invention to provide an improved sewage treatment system.

Another object is to provide an incinerator-based sewage treatment system.

SUMMARY OF THE INVENTION

The present invention is a system for separating sewage into a solid component and a liquid component. The solid component is then incinerated.

In a preferred form of the invention, the system is enclosed in a housing which defines a chamber. The chamber has an inlet port in a top end and an outlet port in a bottom end. In this form, a sewage flow path would be through the inlet port following a vertical axis into the chamber.

An incinerator plate is near the bottom end of the chamber and is oriented transverse to the vertical axis. A tubular filter extends from the incinerator plate vertically toward the top end of the housing. The lateral walls of the filter are permeable to allow liquid to diffuse through.

A diffuser is located within the filter walls. The diffuser has a substantially monotonically increasing radius lateral surface extending from its apex about a central diffuser axis. The diffuser is positioned within the filter with its apex uppermost and with the diffuser axis substantially coaxial with the aforementioned vertical axis.

Sewage is gravity fed through the inlet port over the predetermined shape of the diffuser. In one embodiment, the shape is conical and the filter is cylindrical. The sewage is deflected by the diffuser against the lateral surface of the filter walls so that the liquid portion passes through the filter to the bottom of the chamber. The solid component falls to the incinerator plate where combustion occurs. The flow of the liquid component is directed against the filter so that flow tends to wash the solid component to the incinerator plate, thereby preventing clogging of the filter by the solid component.

Combustion is accelerated by directing a high velocity hot air flow onto the solid component of the sewage which is dried by the airflow. The incinerator plate then heats the sewage to a high temperature suitable for combustion.

BRIEF DESCRIPTION OF THE DRAWINGS

The foregoing and other objects of this invention, the various features thereof, as well as the invention itself, may be more fully understood from the following description, when read together with the accompanying drawing in which.

DESCRIPTION OF THE PREFERRED EMBODIMENT

Figure 1:
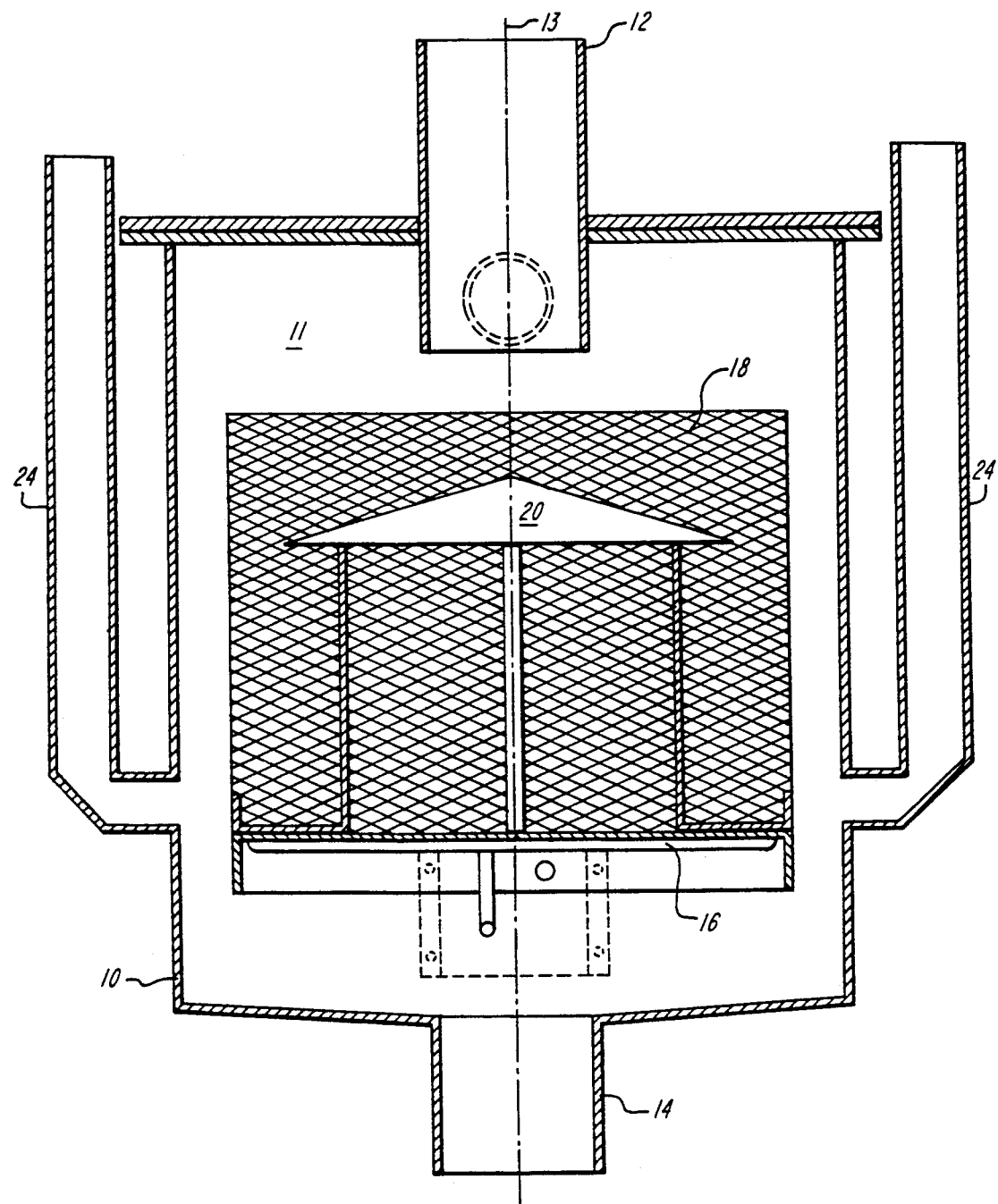
FIG. 1 is a cross-section view of a sewage treatment system in accordance with the invention.

FIG. 1 shows a cross-sectional view of a sewage treatment system embodying the invention. The system is enclosed within a generally cylindrical housing 10 which defines an interior chamber 11. The chamber 11 has an inlet port 12 at the top and an outlet port 14 at the bottom. In the illustrated embodiment posts 12 and 14 are dispersed about a common vertical axis 13. A circular incinerator plate 16 is disposed transverse to axis 13 near the bottom of the chamber. Plate 16 includes heating coils embedded therein. The chamber 11 also has openings where hot air pipes 24 attach. The pipes 24 are configured so that air flowing therethrough is direct to the region of chamber 11 directly above the top surface of plate 16.

Within the chamber 11 is a system for separating a solid component of sewage to be substantially removed from a liquid component. In the system, a tubular filter or screen 18 having a cylindrical lateral surface, extends upward from the periphery of plate 16. In the preferred embodiment, the filter walls are teflon coated. A conical diffuser 20 is supported above the incinerator plate 16 by multiple supports 22. The conical diffuser 20 is enclosed within the tubular filter 18 such that its position is concentric and toward the top of the filter 18.

The tubular filter 18 and the entire separation system is aligned along the vertical axis 13.

In operation, the sewage, generally including a liquid component and a solid component, enters through the inlet port 12, typically gravity-fed. The sewage falls upon the conical diffuser 20 and is directed against the inside surface of the filter 18. The liquid component flows through the filter. By doing this, the diffuser both separates the liquid and solid components of the sewage and also cleans the filter walls. It does so by forcing the liquid component against the filter walls which pushes any solid portion, such as toilet paper, down to the base where it is washed toward the center of the incinerator plate 16. At the same time, the permeable characteristics of the filter wall serves to allow the liquid portion to pass through, while leaving the solid portion trapped inside.

After the solid portion reaches the incineration plate 16, high velocity hot air flows through the hot air pipes 24 to dry the solid material while also raising the temperature within the chamber to create an atmosphere more conducive to combustion.

The incinerator plate then heats up to a high temperature. In the preferred embodiment, the plate achieves a temperature of approximately 1300 degrees Fahrenheit.

The liquid component which was already removed from the filter enclosure 18 and the ash which resulted from burning the solid component may now flow out of the chamber 11 through the outlet port 14 for ultimate disposal.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for separating sewage into a solid component and a liquid component, comprising:
   A. a housing having a top end and a bottom end and defining a chamber disposed along a vertical axis, and having an inlet port disposed about said vertical axis at said top end of said housing and defining an input sewage flow path into said chamber,
   B. an incinerator plate disposed near said bottom end of said housing and transverse to said vertical axis,
   C. a tubular screen filter having liquid permeable lateral walls extending from said incinerator plate about said vertical axis toward said top end of said housing,
   D. a diffuser having a substantially solid lateral surface having a monotonically increasing radius extending from an apex point about a central diffuser axis, and
   E. means for positioning said diffuser within said filter with said apex point uppermost with said diffuser axis substantially coaxial with said vertical axis wherein said diffuser lateral surface has a shape and position wherein gravity fed sewage incident thereon from said inlet port is deflected by said diffuser lateral surface to be incident on said lateral walls of said filter so that said liquid component of said sewage passes through said lateral surfaces to a region of said chamber outside filter and said solid compartment at said sewage is retained within a region of said chamber within said filter and substantially on said incinerator plate.

2. An apparatus according to claim 1 further comprising:
   incinerator means for incinerating said solid component of said sewage on said incinerator plate.

3. An apparatus according to claim 2 wherein said incinerator means includes means for heating said incinerator plate.

4. An apparatus according to claim 3 wherein said incinerator means further includes means for directing an air flow onto said solid component of said sewage and said incinerator plate.

5. An apparatus according to claim 1 wherein said lateral walls of said filter is a substantially cylindrical shell.

* * * * *